United States Patent [19]

Komatsu

[11] Patent Number: 5,051,101
[45] Date of Patent: Sep. 24, 1991

[54] MULTI-POLE CONNECTOR

[75] Inventor: Yasuhiro Komatsu, Osaka, Japan

[73] Assignee: Hosiden Electronics Co., Ltd., Yao, Japan

[21] Appl. No.: 383,445

[22] Filed: Jul. 24, 1989

[30] Foreign Application Priority Data

Jul. 29, 1988 [JP] Japan .................. 63-101220[U]

[51] Int. Cl.⁵ .................................. H01R 13/635
[52] U.S. Cl. .................................. 439/159; 439/350
[58] Field of Search .............. 439/152, 153, 155, 159, 439/160, 260, 267, 266, 350, 353, 357, 140, 141

[56] References Cited

U.S. PATENT DOCUMENTS

| | | | |
|---|---|---|---|
| 4,466,680 | 8/1984 | Sakai et al. | 439/159 |
| 4,695,925 | 9/1987 | Kodai et al. | 439/131 |
| 4,810,200 | 3/1989 | Sakamoto | 439/155 |
| 4,820,183 | 4/1989 | Knapp et al. | 439/152 |
| 4,859,199 | 8/1989 | Kamatsu | 439/267 |
| 4,874,323 | 10/1989 | Shibano | 439/260 |
| 4,952,161 | 8/1990 | Komatsu | 439/155 |
| 4,961,710 | 10/1990 | Komatsu | 439/260 |

FOREIGN PATENT DOCUMENTS

2512193 10/1976 Fed. Rep. of Germany ...... 439/152

Primary Examiner—Gary F. Paumen
Attorney, Agent, or Firm—Jones, Tullar & Cooper

[57] ABSTRACT

A multi-pole connector having a slider adapted to be moved, by the tip of a card inserted into the connector, from a first position where the slider supports contacts of contact pieces disposed side by side in the housing of the connector, to a second position where the slider is located rearward of the contacts is related. When the slider is moved between the first position and the second position with the card tip coming in contact with the slider, the contacts are slidingly transferred between the external contact pieces of the card and the contact supporting surfaces of the slider which are set at the same levels or substantially at the same levels as those of the external contact pieces. When the slider is moved from the first position to the second position or when the slider is located in the second position, the card is locked to the slider by the engagement pieces which are swung as supported by guide surfaces formed in the housing.

16 Claims, 6 Drawing Sheets

MULTI-POLE CONNECTOR

BACKGROUND OF THE INVENTION

1. Field of the Invention

The present invention relates to a multi-pole connector having a plurality of contact pieces, disposed side by side, for connecting a plurality of external contact pieces of a card such as an IC memory card or a cartridge, to external contacts of a computer or the like;

2. Description of the Prior Art

There is known a multi-pole connector arranged such that the contacts of a plurality of contact pieces arranged side by side in the housing of the connector are resiliently connected to the external contact pieces disposed at the tip of a card so that the contacts are electrically conducted to the external contact pieces. A conventional multi-pole connector of this type is generally arranged such that, when a card is inserted in the connector, the contacts of the connector are raised on the external contact pieces of the card while the contact pieces of the connector are displaced against the spring loads thereof by the tip of the card.

In the conventional multi-pole connector having the arrangement above-mentioned into the connector, when pushing a card, it is required to simultaneously apply to the card both force for pushing the card and force for displacing the contact pieces of the connector against the spring loads thereof (hereinafter referred to as setting force). In the conventional multi-pole connector, the spring loads of the contact pieces of the connector may be increased to increase the resilient contact forces of the contacts and the external contact pieces, thereby to improve the reliability of contact therebetween. However, such increase in spring load results in increase in the force required for displacing the contact pieces of the connector against the spring loads thereof at the time of card setting. Thus, the card setting force is accordingly increased. The multi-pole connector has a number of contact pieces, for example 100 or more contact pieces. Accordingly, when the spring load of each of the contact pieces is increased even slightly, the spring loads of the entire contact pieces are considerably increased. This considerably increases the setting force to considerably lower the maneuverability at the time of card setting.

Accordingly, the spring loads of the contact pieces are generally determined such that the maneuverability at the time of card setting is not deteriorated so much. Thus, the conventional multi-pole connector presents the problem that the maneuverability imposes restrictions on improvements in reliability of contact between the contacts and the external contact pieces by increasing the resilient contact forces thereof.

SUMMARY OF THE INVENTION

In view of the problem above-mentioned, the present invention is proposed with the main object of providing a multi-pole connector capable of increasing the resilient contact forces of the external contact pieces of a card and the contact pieces of the connector thereby to improve the reliability of contact therebetween, without the need of displacing the contact pieces of the connector against the spring loads thereof at the time of card setting.

It is another object of the present invention to provide a multi-pole connector having a simple arrangement for maintaining a card at the time of card setting.

It is a further object of the present invention to provide a multi-pole connector capable of removing the card set therein with a simple operation.

It is still another object of the present invention to provide a multi-pole connector capable of accurately guiding the card inserted therein to a predetermined position.

To achieve the main object above-mentioned, the present invention provides a multi-pole connector in which a plurality of contact pieces are disposed, side by side, in the housing of the connector and in which the contacts respectively formed on the contact pieces are adapted to resiliently come in contact with the external contact pieces formed at the tip of a card, while the contacts are being displaced against the spring loads of the contact pieces. The multi-pole connector of the present invention comprises:

a slider adapted to be moved, as pushed by the tip of a card when the same is inserted into the connector, from a first position where the slider supports the contacts, to a second position where the slider is located rearward of the contacts;

contact supporting surfaces formed on the slider in the same levels or substantially in the same levels as those of the external contact pieces of the card, such that, when the slider is moved between the first position and the second position with the tip of the card coming in contact with the slider, the contacts are slidingly transferred, between the external contact pieces of the card, to the contact supporting surfaces;

engagement pieces swingable between the inside and outside of a card inserting and removing passage, the engagement pieces being so connected to the slider as to be engageable with portions to be engaged which are formed at the lateral edges of the card; and guide surfaces formed at the lateral sides of the housing such that, when the slider is located in the first position, the guide surfaces are not opposite to the engagement pieces, and when the slider is moved from the first position to the second position or when the slider is located in the second position, the guide surfaces cause the engagement pieces to be swung toward the inside of the card inserting and removing passage such that the engagement pieces are engaged with the portions to be engaged.

According to the multi-pole connector having the arrangement above-mentioned, when a card is inserted into the connector, the slider is moved from the first position to the second position. When the slider located in the second position is moved to the first position, the card is discharged from the connector. When the slider is moved forward or rearward in this manner, the contacts of the contact pieces in the housing are transferred from the external contact pieces of the card to the contact supporting surfaces of the slider, and vice versa, without displacement against the spring loads of the contact pieces.

Accordingly, force for pushing the card in the connector is merely required as the setting force at the time of card setting, and force for displacing the contacts against the spring load of the contact pieces is not needed. Thus, the setting force is accordingly reduced. Therefore, even though a number of contact pieces are provided with increased spring loads to improve the reliability of contact between the contacts and the external contact pieces, this does not increase the setting force so much. Thus, the maneuverability at the time of card setting is not advantageously lowered.

When the slider is moved to the advance position, the engagement pieces are not opposite to the guide surfaces of the housing, permitting a card to be inserted. On the contrary, when the slider is moved from the first position to the second position or when the slider is located in the second position, the engagement pieces as supported by the guide surfaces are engaged with the portions to be engaged. Accordingly, mere insertion of a card causes the slider and the card to be automatically locked.

If, for some reason, the slider is located in the second position even though a card is not being inserted, the engagement pieces projecting to the space into which a card is to be inserted, serve as stoppers for preventing a card from being inserted. Accordingly, such stoppers automatically provide a safety measure for preventing a card inserted in the connector from coming in contact with the contacts to damage the contact pieces.

According to the multi-pole connector of the present invention, the engagement pieces may be made of plastic and formed integrally with the slider through plastic hinges of which base portions thereof are constricted. In this case, the engagement pieces may be made swingable by a simple arrangement in which the engagement pieces are merely integrally formed.

The multi-pole connector in accordance with the present invention may further comprise an operating lever for card removal, which has one end connected to the slider and the other end transversely extending to the outside of the card inserting and removing passage, this operating lever being provided at the longitudinal center thereof with a rotation fulcrum.

According to the multi-pole connector having such an operating lever, when the slider is moved from the second position to the first position by rotating the operating lever, the card is pulled out as pushed from the back. Accordingly, by properly setting the position of the rotation fulcrum of the operating lever, the force required for removing the card may be reduced. This further improves maneuverability.

Other features and effects of the present invention will be apparent from the following description with reference to the attached drawings.

DETAILED DESCRIPTION OF THE PREFERRED EMBODIMENTS

Figures 1, 2:
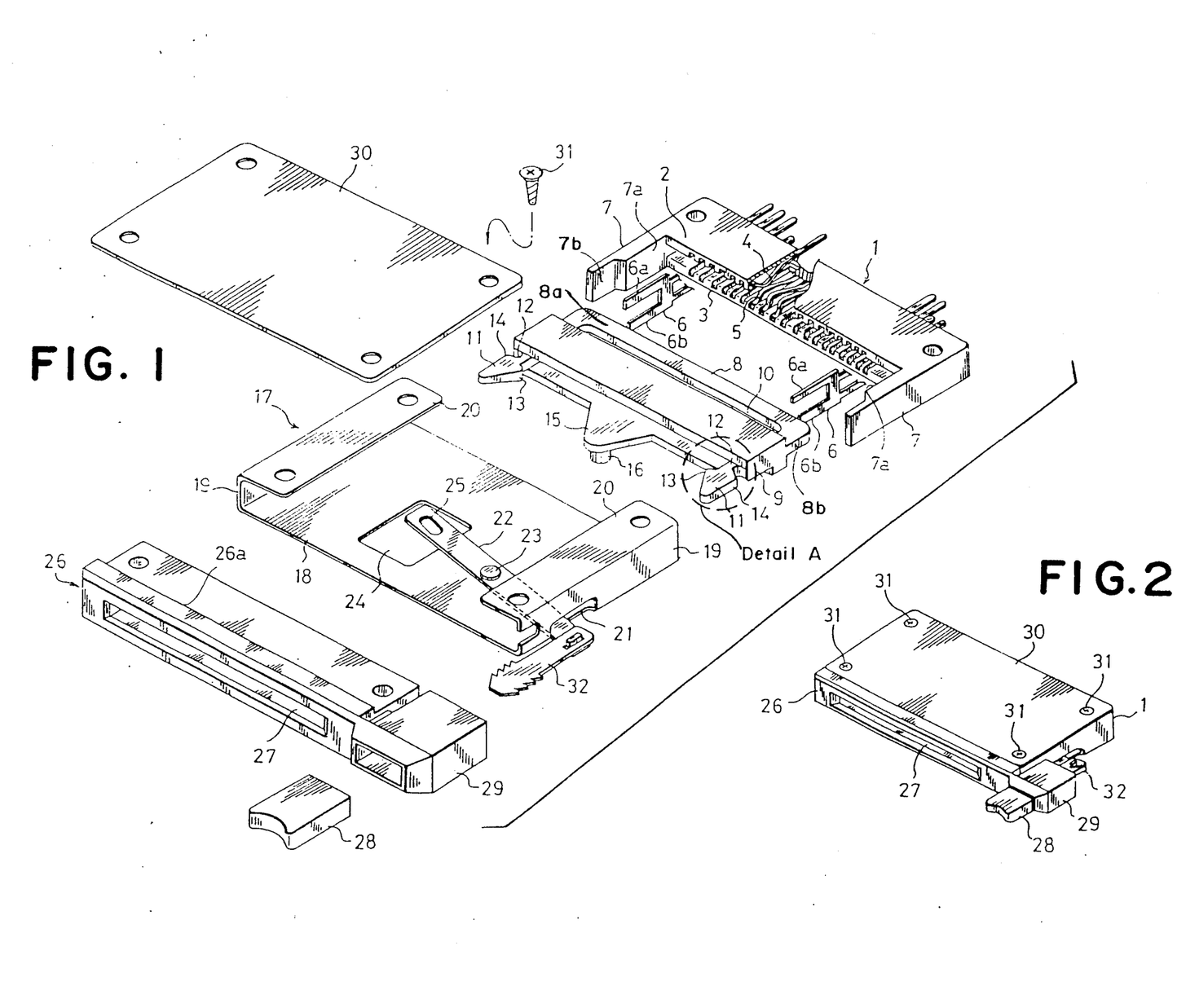
FIG. 1 is an exploded perspective view of a multi-pole connector in accordance with the present invention.
FIG. 2 is a perspective assembled view of the connector in FIG. 1.

As shown in FIG. 1, the multi-pole connector of the present invention has a housing 1 provided with an upper wall 2 and a lower wall 3. The upper and lower walls 2, 3 respectively have a plurality of contact pieces 4, 5 disposed side by side.

Figure 6:
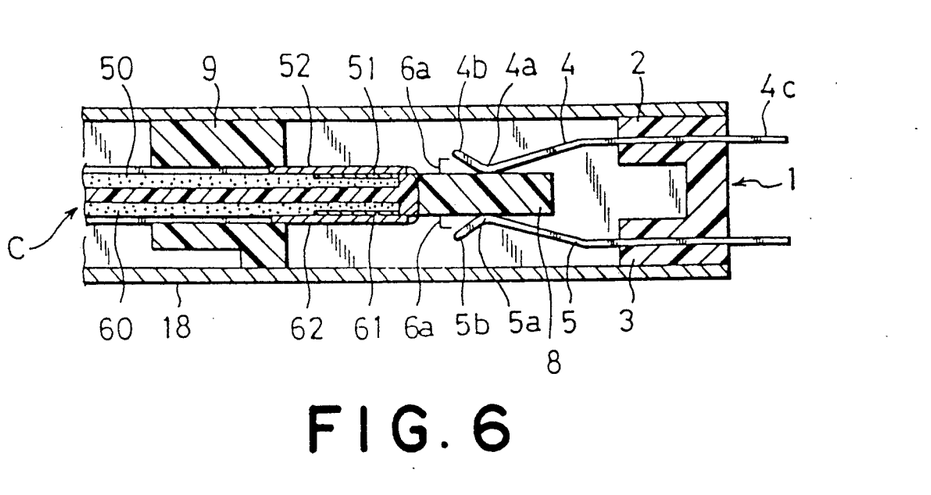
FIG. 6 is a vertical section view of the connector shown in FIG. 3.
Figure 7:
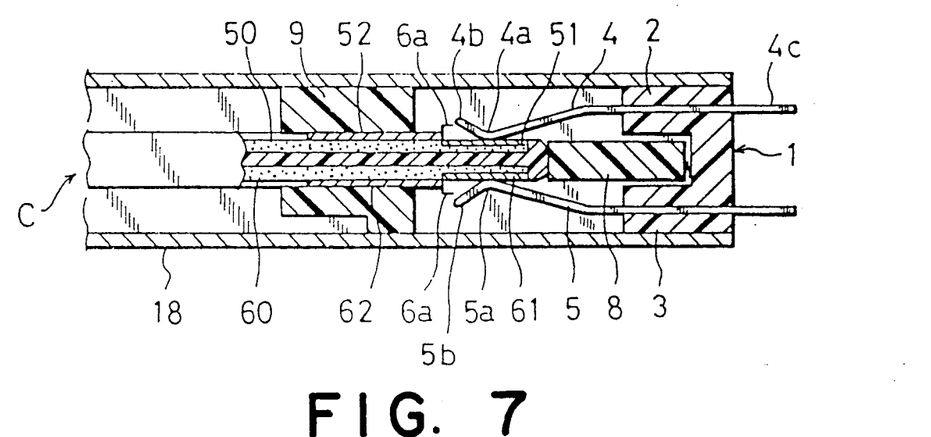
FIG. 7 is a vertical section view of the connector shown in FIG. 4.

As shown in FIGS. 6 and 7, the contact pieces 4, 5 have contacts 4a, 5a and introduction guides 4b, 5b formed by bending the resilient metallic pieces forming the contact pieces at the tips thereof. The rear end portions of the contact pieces 4, 5 form terminals 4c, 5c passing through the housing 1. These terminals 4c, 5c are adapted to be connected to the external contacts of a computer or the like (not shown). The contact pieces 4 and 5 have the same shape and are disposed in a vertically symmetric manner.

The housing 1 is provided at both sides thereof with grounding terminals 6. As shown in FIG. 1, each of the grounding terminals 6 has a pair of projection pieces 6a, 6b vertically branched in the form of a fork. These projection pieces 6a, 6b also serve as openers for opening the shutters of a card, to be discussed later.

The housing 1 is provided at both lateral ends thereof with arms 7. These arms 7 are provided at the inner surfaces thereof with flat guide surfaces 7a parallel to each other. The arms 7 are also provided at the front sides of the guide surfaces 7a with relief portions 7b. The relief portions 7b are so inclined as to increase, in the forward direction, the distance between the opposite inner surfaces of the arms 7.

A slider 8 projects rearwardly, by a predetermined distance, from a flat frame-like guide 9 forming a part of a card inserting and removing passage, to be discussed later. The card inserting and removing passage is a passage through which a card is to be inserted in and removed from the connector. The slider 8 is provided on the obverse and reverse surfaces thereof with contact supporting surfaces 8a, 8b, respectively, to be discussed later. A space 10 is formed between the slider 8 and the guide 9.

Engagement pieces 11 project forwardly from the guide 9 at both lateral sides thereof. The boundary portions between the engagement pieces 11 and the guide 9 are so constricted as to form flexible plastic hinges 12. The engagement pieces 11 are provided with pawls 13 at the front side of the plastic hinges 12. The lateral sides of the engagement pieces 11 are formed as follower surfaces 14 adapted to come in contact with the guide surfaces 7a.

Figure 9:
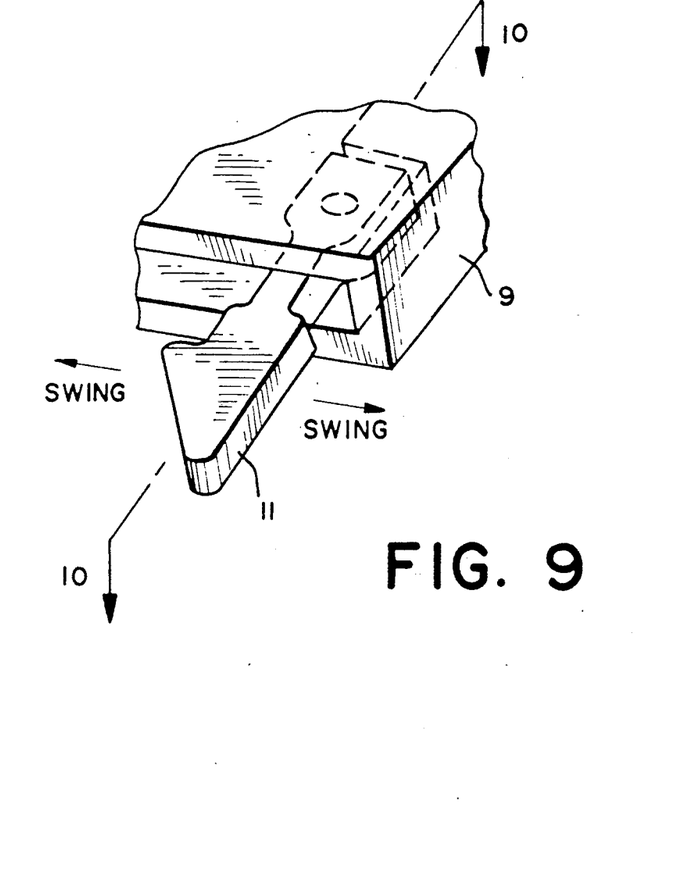
FIG. 9 is an enlarged view of detail A of FIG. 1.
Figure 10:
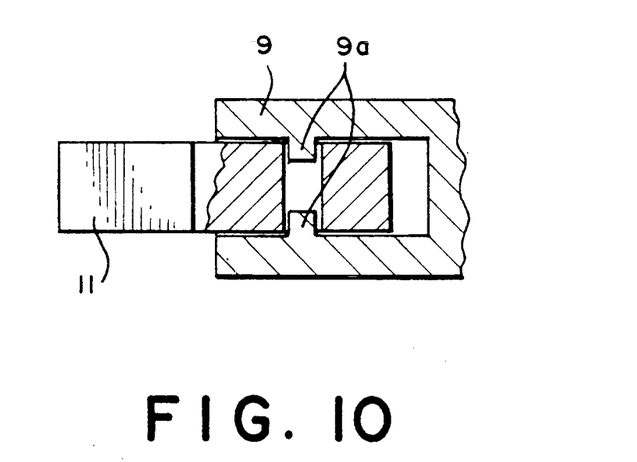
FIG. 10 is a cross-sectional view taken along line 9—9 of FIG. 9.

The engagement pieces 11 may be formed as independent pieces which are separated from the guide 9 as shown i FIGS. 9 and 10. In such a case, the engagement pieces 11 as independent pieces may be hinged to the guide 9. For example, the hinge may comprise protrusions 9a as shown in FIG. 10.

The guide 9 is provided at the center thereof with a forwardly projecting bracket 15. A boss 16 projects downwardly from the bracket 15. In this embodiment, the slider 8, the guide 9, the engagement pieces 11, the bracket 15 and the boss 16 are integrally formed as a molded piece of synthetic resin.

A frame 17 has a bottom plate 18, lateral plates 19 and mounting flanges 20 formed by bending a metallic sheet. A slot 21 is formed in the corner of the bottom plate 18 with respect to one lateral plate 19. An operating lever 22 passes through this slot 21. This operating lever 22 is rotatably attached, at the longitudinal center thereof, to the bottom plate 18 by a pin 23. The bottom plate 18 has an opening 24 in the center thereof One end of the operating lever 22 faces the opening 24. This end has a slot-like engagement hole 25 formed therein. The other end of the operating lever 22 is transversely extended to the outside of the card inserting and removing passage formed in the frame 17.

A frame member 26 for forming a card inserting and removing port 27 is provided with a stepped portion 26a on the circumference thereof at the center in the front-to-back direction thereof The forward portion of the frame member 26 with respect to this stepped portion 26a, vertically projects with respect to the rearward portion of the frame member 26 with respect to this stepped portion 26a. A frame piece 29 for slidingly holding a knob 28 is integrally attached to one side of the frame member 26. An upper cover is generally designated by the reference numeral 30.

The housing 1 and the arms 7 are fitted between the lateral plates 19 of the frame 17. The slider 8 and the guide 9 are fitted between the arms 7. The frame member 26 is fitted, at the rear-side portion thereof with respect to the stepped portion 26a, in the frame 17. The boss 16 is engaged with the engagement hole 25 in the operating lever 22 As shown in FIG. 2, the housing 1, the frame member 26 and the upper cover 30 are secured to the frame 17 with mounting screws 31. The knob 28 is fitted in the frame piece 29 and engagingly secured to a connecting piece 32 which is relatively rotatably connected to the other end of the operating lever 22.

Figure 3:
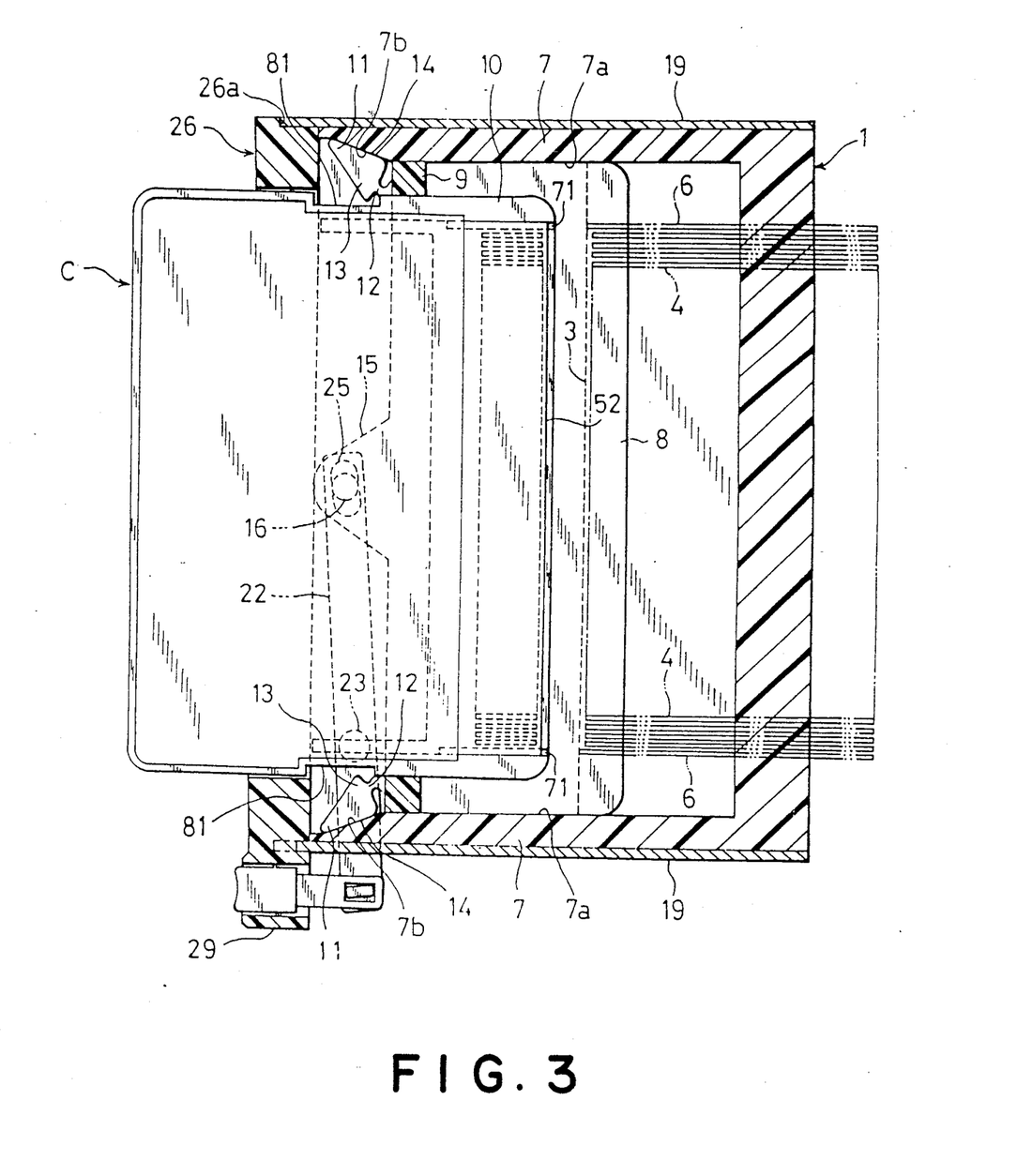
FIG. 3 is a transverse section view of the connector in FIG. 1, illustrating the inner arrangement thereof when the slider is located in the first position.
Figure 4:
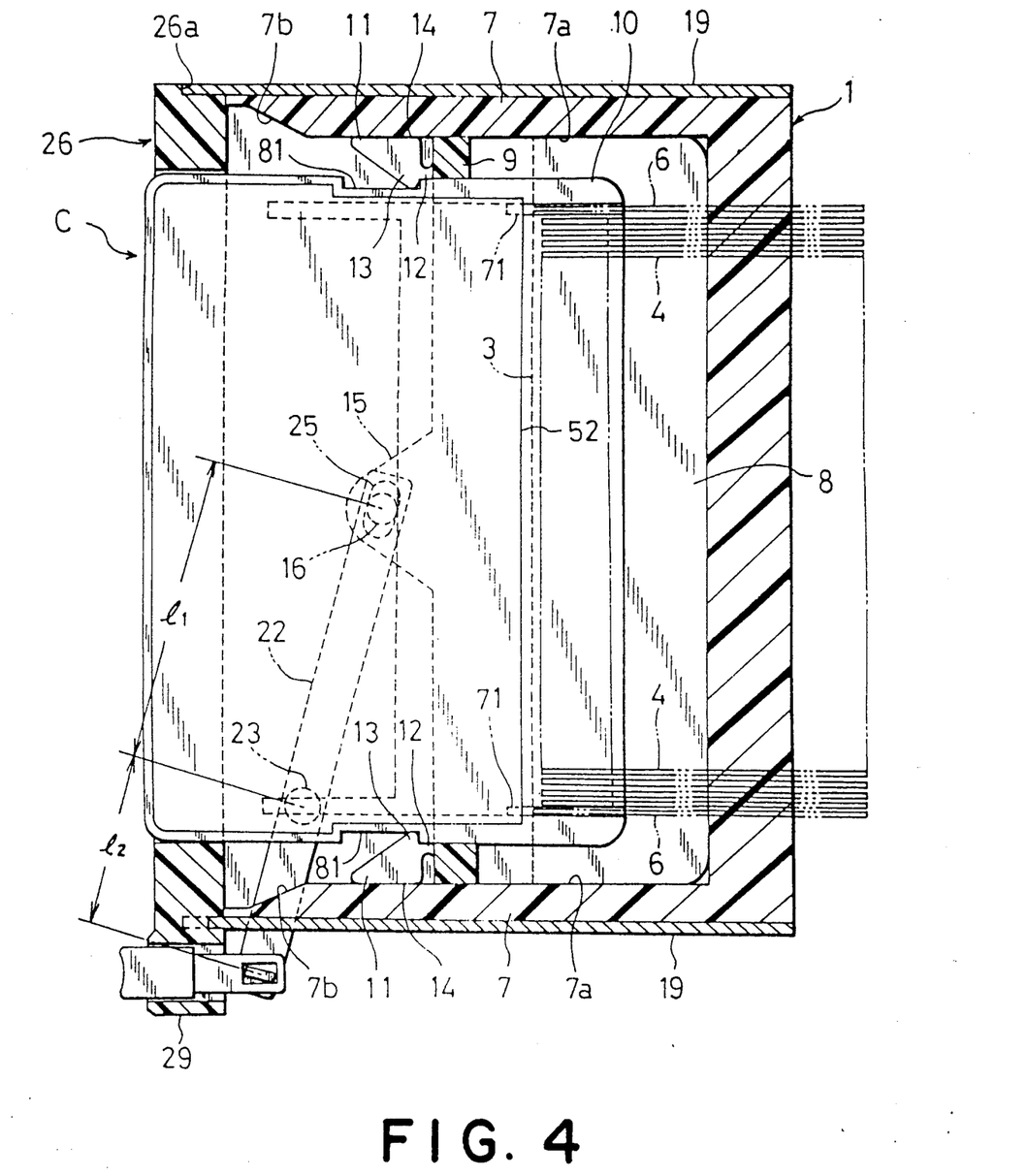
FIG. 4 is a transverse section view of the connector in FIG. 1, illustrating the inner arrangement thereof when the slider accompanied by the card is located in the second position.

In the multi-pole connector assembled as shown in FIG. 2, the slider 8 is movable, as guided by the guide surfaces 7a, between (i) a position where the slider 8 is located between the upper and lower contacts 4a and 5a against the spring loads of the contact pieces 4 and 5, that is, a first position where the slider 8 supports the contacts 4a and 5a shown in FIGS. 3 and 6, and (ii) a second position where the slider 8 is located rearward of the contacts 4a and 5a as shown in FIGS. 4 and 7.

When the slider 8 is located in the first position, the engagement pieces 11 are not opposite to the guide surfaces 7a, but come in contact with the relief portions 7b. In the first position, the back-up action of the guide surfaces 7a is not applied to the engagement pieces 11, so that the engagement pieces 11 are swingable, around the plastic hinges 12, between the inside and the outside of the card inserting and removing passage.

Figure 5:
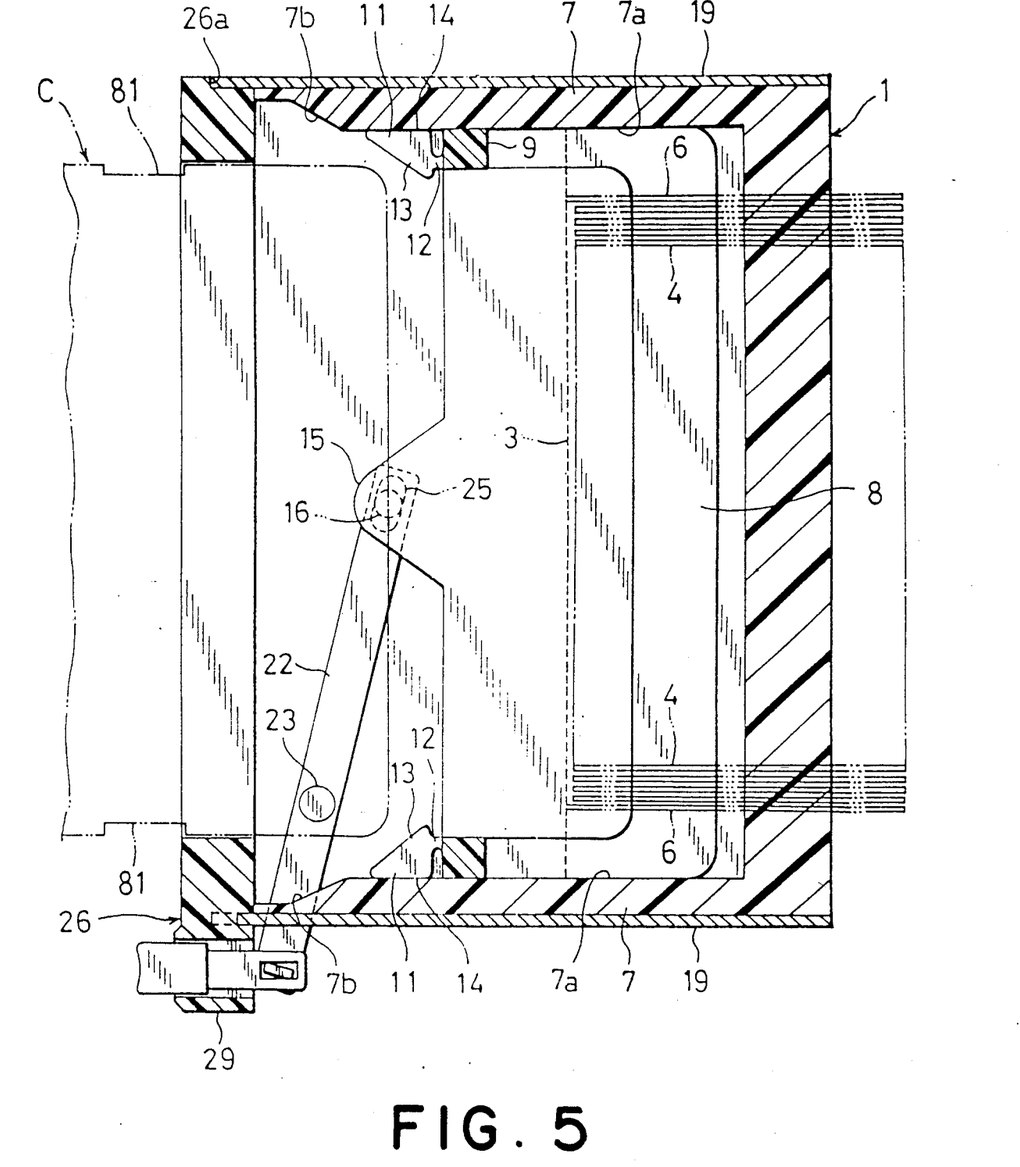
FIG. 5 is a transverse section view of the connector in FIG. 1, illustrating the inner arrangement when the slider not accompanied by the card is located in the second position.

When the slider 8 is moved from the first position to the second position, or located in the second position, the follower surfaces 14 of the engagement pieces 11 come in sliding contact with the guide surfaces 7a as shown in FIGS. 4 and 5. Accordingly, the back-up action of the guide surfaces 7a is applied to the engagement pieces 11 so that the pawls 13 of the engagement pieces 11 project inwardly of the card inserting and removing passage.

When the knob 28 in FIG. 2 is pushed to rotate the operating lever 22 with the setting position of the pin 23 serving as a fulcrum at the time when the slider 8 is located in the second position as shown in FIGS. 4, 5 and 7, the boss 16 engaged with the engagement hole 25 in the operating lever 22 is pulled forward This causes the slider 8 to be moved to the first position.

Figure 8:
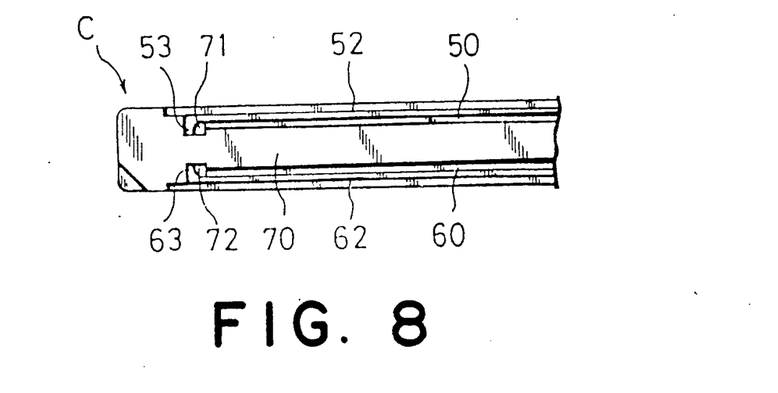
FIG. 8 is a front view of a portion of a card.

As shown in FIGS. 6 and 7, a card C is provided on the obverse and reverse surfaces thereof with printed circuit boards 50, 60. A plurality of external contact pieces 51, 61 are disposed, side by side, at the tips of the printed circuit boards 50, 60. It is noted that these tips project from the main body of the card C. The card C is provided at the main body thereof with shutters 52, 62. A spring load is applied to the shutters 52, 62 such that the shutters 52, 62 are normally so biased as to cover the external contact pieces 51, 61. As shown in FIG. 8, the card C has an edge frame 70 sandwiched between the tips of the printed circuit boards 50, 60. Grooves 71, 72 are formed in this edge frame 70. Fitted in the grooves 71, 72 are the edges 53, 63 formed at both ends of the shutters 52, 62. The card C is provided at the centers of both lateral edges thereof with recessed portions to be engaged 81, which are adapted to be opposite to the engagement pieces 11.

As apparent from FIGS. 6 and 7, when the tip of the card C comes in contact with the slider 8, the external contact pieces 51, 61 of the card C are respectively located at the same levels or substantially at the same levels as those of the contact supporting surfaces 8a, 8b on the obverse and reverse surfaces of the slider 8. The term of "substantially in the same levels" refers to a state which does not present a considerable difference in level between each of the external contact pieces 51 & 61 and each of the contact supporting surfaces 8a & 8b. This term includes not only a difference in level which is inevitably formed dependent on the manufacturing precision applied, but also a difference in level resulting from the increase or decrease in displacement of the contact pieces 4, 5 against the spring loads thereof when the contacts 4a, 5a are transferred to the external contact pieces 51, 61 of the card C from the contact supporting surfaces 8a, 8b of the slider 8 with the movement of the slider 8 pushed by the card C, from the first position to the second position. The difference in level to such extent is rather preferable since it is useful, in association with the arm length and the set position of the rotation fulcrum of the operating lever 22, for adjusting the setting force or the resetting force.

In the arrangement above-mentioned, when the slider 8 is located in the first position as shown in FIGS. 3 and 6, the engagement pieces 11 are not opposite to the guide surfaces 7a, permitting the card C to be inserted.

When the card C is inserted through the card inserting and removing port 27 and the guide 9 such that the card tip comes in contact with the slider 8, and the card is further pushed in, the slider 8 is moved from the first position to the second position together with the card. With such movement, the engagement pieces 11 as supported by the guide surfaces 7a are engaged with the portions to be engaged 81 such that the slider 8 and the card C are held and as such are locked with each other. At the same time, the projection pieces 6a, 6b of the grounding terminals 6 are inserted in the grooves 71, 72 in the card C to pushingly open the shutters 52, 62. The contacts 4a, 5a are transferred from the contact supporting surfaces 8a, 8b of the slider 8 to the external contact pieces 51, 61, without displacement of the contacts 4a, 5a against the spring loads of the contact pieces 4, 5. In this case, even though the contacts 4a, 5a are displaced against the spring loads of the contact pieces 4, 5, the force provoking such displacement is very small and therefore does not lower the maneuverability. Accordingly, when the contact pieces 4, 5 are provided with great spring loads, the contacts 4a, 5a resiliently come in contact with the external contact pieces 51, 61 with great force, thereby to improve the reliability of contact therebetween, without deterioration in maneuverability at the time of card setting.

In the state above-mentioned, when the knob 28 is pushed to rotate the operating lever 22, the slider 8 is returned, as pulled by this rotation, from the second position to the first position while pushing the card C from the back. At this time, the contacts 4a, 5a are transferred from the external contact pieces 51, 61 to the support surfaces 8a, 8b of the slider 8 without displacement against the spring loads of the contact pieces 4, 5. Thus, the contacts 4a, 5a are returned to the state as shown in FIGS. 3 and 6. The engagement pieces 11 are disengaged from the portions to be engaged 81 and the lock state of the card C with respect to the slider 8 is released The projection pieces 6a, 6b of the grounding terminals 6 come out from the grooves 71, 72. This causes the shutters 52, 62 to be closed. The maneuverability at the time of card removal may be improved by shortening the distance the $l_1$ between the rotation fulcrum (the set position of the pin 23) of the operating lever 22 and the one end of the operating lever 22, or by lengthening the distance $l_2$ between the rotation fulcrum and the other end of the operating lever 22.

If, for some reason, the slider 8 is located in the second position even though the card C is not being set, the spring loads of the contact pieces 4, 5 cause the contacts 4a, 5a to project toward the inside of the space into which the card C is to be inserted. In this case, the engagement pieces 11 supported by the guide surfaces 7a project to the inside of the space into which the card C is to be inserted, as shown in FIG. 5. When the card C is inserted into this space, the card C comes in contact with the engagement pieces 11 as shown by virtual lines in FIG. 5. This does not involve the likelihood that the card C will strike against the contact pieces 4, 5 resulting in damage thereto.

The operating lever 22 is not necessarily required. That is, if the slider 8 is so arranged as to be directly operated, the slider may be attached, in a manner movable in the front-to-back direction, to the housing in which the contacts are disposed side by side.

It is noted that examples of the card include not only a thin card such as a memory card, but also a cartridge.

What is claimed is:

1. A multi-pole connector in which a plurality of contact pieces are disposed side by side in a housing of the connector and in which contacts respectively formed on the contact pieces are adapted to resiliently come in contact with external contact pieces formed at the tip of a card, while the contacts are being displaced against spring loads of the contact pieces, said multi-pole connector comprising:
   a slider adapted to be moved, by the tip of a card when the same is inserted into said connector, from a first position where said slider supports said contacts, to a second position where said slider is located rearward of said contacts;
   contact supporting surfaces formed on said slider in the same levels or substantially in the same levels as those of the external contact pieces of said card, such that, when said slider is moved between said first position and said second position with the tip of the card coming in contact with said slider, such movement causes said contacts to be slidingly transferred from said contact supporting surfaces to said external contact pieces of the card;
   an operating lever for card removal, said operating lever having one end connected to the slider and the other end extending transversely to the outside of the card inserting and removing passage, said operating lever being provided at the longitudinal center thereof with a rotation fulcrum.

2. A multi-pole connector as set forth in claim 1, further comprising a frame to which the housing and a frame member forming a card inserting and removing port are fitted, said frame supporting the rotation fulcrum of the operating lever for card removal.

3. A multi-pole connector as set forth in claim 2, further comprising:
   a connecting piece connected to the other end of the operating lever for card removal;
   a knob engagingly secured to said connecting piece; and
   a knob guiding frame piece formed integrally with the frame member forming the card inserting and removing port, said knob guiding frame piece being adapted to slidingly hold said knob.

4. A multi-pole connector in which a plurality of contact pieces are disposed side by side in a housing of the connector and in which contacts respectively formed on the contact pieces are adapted to resiliently come in contact with external contact pieces formed at the tip of a card, while the contacts are being displaced against spring loads of the contact pieces, said multi-pole connector comprising:
   a slider adapted to be moved, by the tip of a card when the same is inserted into said connector, from a first position where said slider supports said contacts, to a second position where said slider is located rearward of said contacts;
   contact supporting surfaces formed on said slider in the same levels or substantially in the same levels as those of the external contact pieces of said card, such that, when said slider is moved between said first position and said second position with the tip of the card coming in contact with said slider, such movement causes said contacts to be slidingly transferred from said contact supporting surfaces to said external contact pieces of the card;
   engagement pieces swingable between the inside and outside of a card inserting and removing passage in said housing and so connected to said slider as to be engageable with portions to be engaged which are formed at the lateral edges of the card; and
   guide surfaces formed at the lateral sides of said housing such that, when said slider is located in said first position, said guide surfaces are not opposite to said engagement pieces, and when said slider is moved from said first position to said second position or when said slider is located in said second position, said guide surfaces support said engagement pieces so that said engagement pieces are swung toward the inside of said card inserting and removing passage such that said engagement pieces are engaged with said portions to be engaged.

5. A multi-pole connector as set forth in claim 4, wherein the engagement pieces are made of plastic and formed integrally with the slider through plastic hinges having constricted base portions.

6. A multi-pole connector as set forth in claim 4, wherein the engagement pieces are formed as individual pieces which are separated from the slider, said engagement pieces being connected to said slider through hinges.

7. A multi-pole connector as set forth in claim 5, further comprising an operating lever for card removal, said operating lever having one end connected to the slider and the other end extending transversely to the outside of the card inserting and removing passage, said operating lever being provided at the longitudinal center thereof with a rotation fulcrum.

8. A multi-pole connector as set forth in claim 6, further comprising an operating lever for card removal, said operating lever having one end connected to the slider and the other end extending transversely to the outside of the card inserting and removing passage, said operating lever being provided at the longitudinal center thereof with a rotation fulcrum.

9. A multi-pole connector as set forth in claim 7, further comprising a frame to which the housing and a frame member forming a card inserting and removing port are fitted, said frame supporting the rotation fulcrum of the operating lever for card removal.

10. A multi-pole connector as set forth in claim 8, further comprising a frame to which the housing and a frame member forming a card inserting and removing port are fitted, said frame supporting the rotation fulcrum of the operating lever for card removal.

11. A multi-pole connector as set forth in claim 9, further comprising:
a connecting piece connected to the other end of the operating lever for card removal;
a knob engagingly secured to said connecting piece; and
a knob guiding frame piece formed integrally with the frame member forming the card inserting and removing port, said knob guiding frame piece being adapted to slidingly hold said knob.

12. A multi-pole connector as set forth in claim 10, further comprising:
a connecting piece connected to the other end of the operating lever for card removal;
a knob engagingly secured to said connecting piece; and
a knob guiding frame piece formed integrally with the frame member forming the card inserting and removing port, said knob guiding frame piece being adapted to slidingly hold said knob.

13. A multi-pole connector as set forth in claim 5, wherein the slider is disposed rearward of a guide forming at least a part of the card inserting and removing passage, and said slider is formed integrally with said guide, the engagement pieces being connected to said guide.

14. A multi-pole connector as set forth in claim 6, wherein the slider is disposed rearward of a guide forming at least a part of the card inserting and removing passage, and said slider is formed integrally with said guide, the engagement pieces being connected to said guide.

15. A multi-pole connector as set forth in claim 11, wherein the slider is disposed rearward of a guide forming at least a part of the card inserting and removing passage, and said slider is formed integrally with said guide, the engagement pieces being connected to said guide.

16. A multi-pole connector as set forth in claim 15, further comprising an opener adapted to open shutters disposed on the card when the card is inserted to come in contact with the slider.

* * * * *